Sept. 16, 1930.                G. L. SMITH                1,775,872
                              BRAKE SYSTEM
                           Filed March 27, 1928
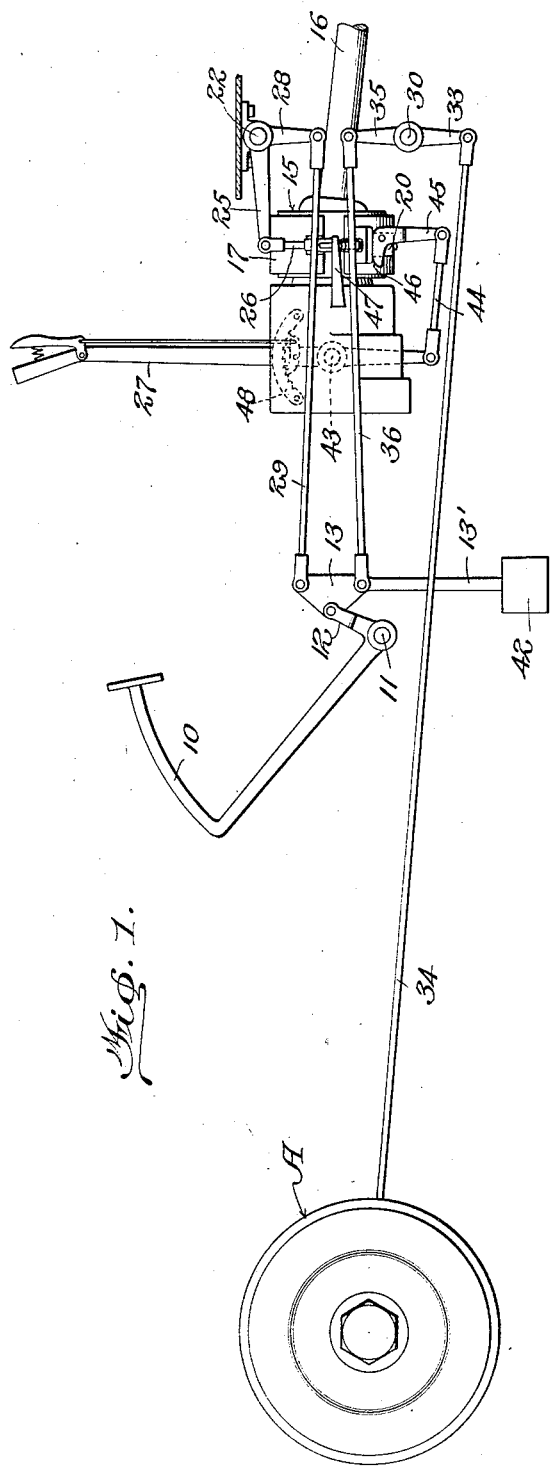
Inventor
George L. Smith,
by Bright & Bailey
Attorneys Patented Sept. 16, 1930

1,775,872

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE SYSTEM

Application filed March 27, 1928. Serial No. 265,040.

My invention relates to brake systems for motor vehicles and particularly that type adapted to simultaneously apply a retarding force either directly or indirectly to the front and rear wheels of such vehicle.

Generally speaking it is the purpose of my invention to provide a brake system of the type specified which will eliminate a large number of the parts of such systems as now constructed with resultant economy in production and installation; and which will give great braking power with safety under all operating conditions which may be encountered.

The conventional design of motor vehicles permits the use of a brake on the propeller shaft for braking the vehicle through the rear wheels, but the use of such a brake has been heretofore avoided owing to the additional stresses imposed thereby on the drive mechanism between the engine and rear wheels. My invention contemplates the use of a brake on the propeller shaft of an automobile; but in association with novel features of construction and arrangement which serve to reduce the aforementioned stresses to a point well below those produced by the engine so that such a brake can be used with safety and thus enable me to attain a material reduction in the production cost of motor vehicles equipped with brake systems of the general type specified, by the elimination from such systems of rear wheel brakes and their operating connections.

In carrying my invention into practice I combine front wheel brakes with a propeller shaft or transmission brake, and by a peculiar and novel method of control produce a brake system capable of producing powerful braking under those conditions where powerful braking action is needed and safe braking under those conditions where excessive braking action cannot be used, such as on slippery pavement.

It is well known that the weight supported by the front and rear axles of a motor vehicle varies with the severity of the retarding force imposed by brake application during vehicle travel. As a result of the imposition of such retarding force during vehicle travel weight is removed from the rear axle of the vehicle and transferred to the front axle. The amount of weight transferred from the rear axle to the front axle under the conditions specified is proportional to the retarding force and is readily computable.

As the weight carried by the axles of a motor vehicle controls the pressure of the wheel tires on the road and as this pressure controls the amount of braking force which the tires can deliver to the road, it is evident that, if proper, efficient and safe braking is to be attained during vehicle travel, means must be provided for varying the front and rear brake forces of the brake system. In other words as the weight is eased off the rear axle and wheels and shifted to the front axle and wheels by the retarding force incident to brake application during vehicle travel, the brake force should be eased off the rear of the brake system and built up in the front thereof, to thereby prevent the rear wheels locking long prior to the front wheels being subjected to a brake force sufficient to effect their locking, with needless sacrifice of brake power resulting.

My invention therefore, also contemplates the provision in a brake system of the type specified, of means for varying the relative power of the front and rear brakes while the brakes are in operation and by combining such means with front wheel brakes and a transmission brake I produce the equivalent of a four wheel brake system wherein the retarding forces delivered to the road surface by each of the several wheel tires is approximately proportional to the tire pressure on such surface, so that danger of locking a wheel by braking is reduced while at the same time brake power is increased. Furthermore, the increased brake power derived from the front brakes produces a greater transfer of weight from the rear axle to the front axle of the vehicle so that the rear wheels are more easily locked and therefore a transmission brake of relatively small power can be utilized. Thus the maximum brake stresses on the drive mechanism are reduced well below those produced by the engine and danger of failure or excessive wear of such mechanism is avoided.

To further explain why my device as previously stated gives safe braking under conditions where excessive braking action cannot be used, such as on slippery pavement, it is evident that under such conditions and upon brake application the retardation of the vehicle would be slight and the transfer of weight to the front axle and wheels correspondingly small, so that the brake power of the rear wheels would be about as great as that of the front wheels thus utilizing to the best advantage all four points of contact of the wheels with the slippery surface. This action is especially desirable in descending a slippery hill at a constant speed as much better control of the vehicle would be obtained.

To further reduce possible danger of losing brake power in my improved system and to comply with legal requirements specifying two separate sets of brakes I employ a hand lever cooperatively associated with the transmission brake and operable not only to brake the vehicle in case of emergency, but also operable to tighten the transmission brake so that, should the driver find the permissible movement of the brake foot pedal ineffective to properly service the brakes, he could overcome this condition while driving the vehicle by pulling up the hand lever to directly tighten the transmission brake and to cause the front brakes in subsequent operation to tighten up as the brake pedal is depressed and thus restore proper service braking until such time as he has the opportunity to adjust the entire brake system. This restoration of proper service braking, under the conditions specified, constitutes one of the safety elements of my improved brake system.

In the drawings chosen to illustrate my invention, the scope whereof is set forth in the appended claims—

Fig. 1 is a side elevation of a brake system constructed in accordance with my invention; and Fig. 2, a rear view thereof.

Referring to the drawing, 10 denotes the foot brake pedal of a motor vehicle mounted on a pivot 11. To the short arm 12 of the pedal 10 is pivoted an equalizer bar 13 having a downwardly directed extension 13', the free end of which carries an inertia weight 42.

A transmission brake 15 is mounted on the propeller shaft 16 and is composed of a brake band 17, brake lever 18, tension bolt 19, adjusting nut 20, and anchor 21. An operating shaft 22 for this transmission brake is mounted on an associated vehicle by means of end bearings 23 and 24 and attached thereto is a lever 25 which is connected to the brake lever 18 by a link 26 so that clockwise rotation of shaft 22 (Fig. 1) will pull on link 26 and apply the transmission brake. The lever 28 keyed to the shaft 22 is connected to the yoke 13 by the pull rod 29, so that depression of pedal 10 sets the transmission brake. An operating shaft 30 for front wheel brakes is mounted on an associated vehicle by means of the bearings 31 and 32. This shaft carries downwardly extending levers 33 at its ends from which the brake pull rods 34 extend forward to the front wheel brakes A. A lever 35 is keyed to this shaft 30 about in line with lever 28 and connection between lever 35 and yoke 13 is made by the pull rod 36, so that depression of pedal 10 will likewise set the front wheel brakes.

The mechanism heretofore described operates as follows: Depression of the pedal 10 pulls on both rods 29 and 36, the pull of each rod being such as to generate brake forces for front and rear wheels proportional to the weight carried by these wheels when car is at rest. When the car is slowed down by the brakes during vehicle travel the retardation causes the weight 42 on extension 13' to swing forward, increasing the pull on rod 36 and decreasing the pull on rod 29. This increases in turn the force of the front brakes and decreases that of the transmission brake in proportion as the transfer of car weight from rear axle and wheels to front axle and wheels takes place.

My invention further embodies an emergency brake lever 27 pivoted in the usual manner at 43 and connected at its lower end with a link 44. The rear end of this link connects with the cam lever 45. This cam lever 45 is pivotally carried by the brake adjusting nut 20 and has a cam surface 46 to force one end of the band 17 towards the lever 18 the same as would be the case when nut 20 is screwed up, said nut being adjustable by disconnecting link 44 from lever 45 and utilizing lever 45 in lieu of a wrench to rotate said nut. To assure safe braking should any parts from link 26 up to pedal 10 be broken I provide a back stop 47 for lever 18 to react against so that the brake 17 can be set by hand lever 27. This construction not only gives two independent connections to the brake 17, but also permits the driver to get the equivalent of a brake adjustment by pulling back the hand lever a notch or two on the ratchet arc 48. As this can be done while car is in motion it is therefore possible to tighten or adjust the brakes while driving and avoid danger of accident due to insufficient brake action.

The brake stop 47 provided to permit positive setting of the transmission brake 17 by the hand lever 27 also permits the use of this hand lever in cases of emergency to neutralize the action of the inertia weight 42 as follows:—If both pedal 10 and hand lever 27 are operated at the same time the effect of each would be to set all brakes in the proportion controlled by the weight 42 until hand lever were pulled back far enough to force lever 18 against the stop 47. After this point is reached further pull on hand lever would increase power of transmission brake independently of that of front brakes and the action of inertia weight would be cut out of the system.

To summarize the action of my system I provide first an automatic means of varying the front and rear brake forces so that when the vehicle is slowed down by brake action the weight 42 operates the parts to build up the front brake force and decrease the rear brake force. Also if for any reason the driver desires more brake power from the rear system he can manually increase the rear brake force by pulling up on hand lever 27 as above described. Should his brakes be badly worn down he can set lever 27 back a notch or two which will tighten up on the transmission brake. This will cause weight 42 to swing forward slightly when lever 10 is depressed and thus tighten up front brakes also. Should the entire hook-up back to brake lever 18 be placed out of operation the brake 17 could still be set by the hand lever 27.

The subject matter of this application which relates to a multiple brake operating system as distinguished from a four wheel braking system is covered by the claims of a divisional application filed October 8, 1929, Serial No. 398,182.

I claim:

1. In a brake system for motor vehicles, a front wheel brake device, a rear wheel brake device, a weighted lever connecting said devices, and brake applying means connected to said lever at a point between the points of attachment of the brake devices, the center of gravity of said lever being located below the point of connection thereof to the front wheel brake device.

2. A brake system comprising brakes for applying retarding forces to the front and rear pairs of wheels respectively of a vehicle, a brake applying device common to said brakes, and means operable automatically to impart brake applying forces to said brakes in excess of the forces imparted to them by said device and to vary the ratio between the forces imparted to the respective brakes.

3. A brake system comprising brakes for applying retarding forces to the front and rear pairs of wheels respectively of a vehicle, a brake applying device common to said brakes, and means operable by retardation of vehicle movement to impart brake applying forces to said brakes in excess of the forces imparted to them by said device and to vary the ratio between the forces imparted to the respective brakes.

4. A brake system comprising brakes for applying retarding forces to the front and rear pairs of wheels respectively of a vehicle, a brake applying device common to said brakes, and means operable to impart brake applying forces to said brakes in excess of the forces imparted to them by said device and to maintain the value of the forces applied to said brakes proportional to the weight carried by the front and rear pairs of wheels while said forces are controlling movement of the vehicle.

5. A brake system comprising brakes for applying retarding forces to the front and rear pairs of wheels respectively of a vehicle, a brake applying device common to said brakes, and means operable automatically to impart brake applying forces to said brakes in excess of the forces imparted to them by said device and to maintain the value of the forces applied to said brakes proportional to the weight carried by the front and rear pairs of wheels while said forces are controlling movement of the vehicle.

6. A brake system comprising brakes for applying retarding forces to the front and rear pairs of wheels respectively of a vehicle, a brake applying device common to said brakes, and means operable by retardation of vehicle movement incident to brake application to impart brake applying forces to said brakes in excess of the forces imparted to them by said device and to maintain the value of the forces applied to said brakes proportional to the weight carried by the front and rear pairs of wheels while said forces are controlling movement of the vehicle.

7. A brake system for vehicles comprising a front wheel brake, a rear wheel brake, a lever, a connecting element between each brake and said lever, said elements being attached to said lever at spaced points respectively, a brake applying device pivotally connected to said lever at a point between the points of attachment of said connecting elements therewith, and a weight rigid with said lever adapted under predetermined conditions to rotate same about its point of pivotal connection with said brake applying device.

8. A brake system for vehicles comprising a front wheel brake, a rear wheel brake, a weighted lever, a connecting element between each brake and said lever, said elements being attached to said lever at spaced points respectively, a brake applying device pivotally connected to said lever at a point between the points of attachment of said connecting elements therewith, the connecting element between the front wheel brake and said lever being attached to said lever at a point between the center of gravity of said lever and the point of attachment thereto of the connecting element to the rear wheel brake.

In testimony whereof I hereunto affix my signature.

GEORGE L. SMITH.